United States Patent
Fischer et al.

(10) Patent No.: US 7,874,064 B2
(45) Date of Patent: Jan. 25, 2011

(54) DEVICE FOR POSITIONING AND FIXING WIRES IN TUBES

(75) Inventors: Achim Fischer, Aschaffenburg (DE); Werner Burkhardt, Brachttal (DE); Klaus Huthmacher, Geinhausen (DE)

(73) Assignee: Evonik Degussa GmbH, Essen (DE)

( * ) Notice: Subject to any disclaimer, the term of this patent is extended or adjusted under 35 U.S.C. 154(b) by 424 days.

(21) Appl. No.: 11/185,330

(22) Filed: Jul. 20, 2005

(65) Prior Publication Data
US 2006/0016068 A1 Jan. 26, 2006

(30) Foreign Application Priority Data
Jul. 23, 2004 (DE) .................. 10 2004 035 890

(51) Int. Cl.
*H01R 43/00* (2006.01)
*B23Q 15/00* (2006.01)
*A41H 37/06* (2006.01)
(52) U.S. Cl. .................. 29/748; 29/721; 29/754; 29/768
(58) Field of Classification Search ............ 29/747–49, 29/721, 754, 768
See application file for complete search history.

(56) References Cited

U.S. PATENT DOCUMENTS

| 3,022,670 A | | 2/1962 | Sutcliffe, Jr. |
| 4,385,197 A | * | 5/1983 | Schwagerman ............. 136/221 |
| 4,753,114 A | * | 6/1988 | Jones et al. ................. 73/861 |
| 4,801,886 A | * | 1/1989 | Steininger .................. 324/438 |
| 5,085,250 A | * | 2/1992 | Kendrick .................... 138/44 |
| 5,365,795 A | * | 11/1994 | Brower, Jr. ............... 73/861.65 |
| 5,614,720 A | * | 3/1997 | Morgan et al. ........... 250/360.1 |
| 6,543,297 B1 | * | 4/2003 | Kleven .................... 73/861.52 |
| 2003/0136196 A1 | * | 7/2003 | Wiklund et al. ............... 73/716 |

FOREIGN PATENT DOCUMENTS

| EP | 0 272 475 A2 | 6/1988 |
| GB | 1 378 279 | 12/1974 |

* cited by examiner

*Primary Examiner*—A. Dexter Tugbang
*Assistant Examiner*—David P Angwin
(74) *Attorney, Agent, or Firm*—Smith, Gambrell & Russell, LLP

(57) ABSTRACT

A device for fixing and positioning in tubes and its use in tubular reactors.

24 Claims, 2 Drawing Sheets

DEVICE FOR POSITIONING AND FIXING WIRES IN TUBES

INTRODUCTION AND BACKGROUND

The invention relates to a device for positioning and fixing solid or hollow wires in tubes.

In chemical reaction technology, the positioning and fixing of wires, in particular thermocouples, in tubular reactors is of great significance. It is intended to be possible to measure the temperature at various points over the entire length of the tubes.

In this context, the term hollow wires also includes capillaries through which gaseous or liquid educts are introduced at a desired height into the reaction tube. These capillaries may likewise be provided as an enclosure for thermocouples which one wishes to position in the region between the holders. The capillaries can also be used for sampling during the reaction and removing the desired samples by suction.

In this case, it is undesired for the positioning to necessitate drilling into the wall of the tube, which would make the effort involved in production increase to an impractical level, in particular for shell-and-tube reactors which have several thousand tubes. Feed inlets of this type would adversely influence the catalyst pellet fill, allowing channelling and inhomogeneous dynamic pressure distributions to occur.

SUMMARY OF THE INVENTION

The object of the invention is to provide a device with which these disadvantages are avoided.

The invention relates to a device for positioning and fixing solid and hollow wires in tubes (later also referred to as holders), comprising a non-closed annular element, which has a smaller cross section than these tubes, the wall of which has at least one bore for leading through a wire, in particular a thermocouple, and in which there is a continuous slot, preferably parallel to the extent of the tube.

By expansion or compression, the diameter of the device can be adapted to that of the tube, so that it is in close contact with the wall.

Depending on the dimensions of the device, it contains one or more bores for leading through wires, such as thermocouples or capillaries.

Its length inside the annular device and perpendicular to the direction of the tube preferably corresponds to half the diameter of the tube, so that the temperature measurement takes place in the middle of the latter.

However, other dimensions are also possible. The wires are preferably fastened to the lead-throughs by soldered joints and are led to the end of the tube on its wall, possibly clustered together. They may also be fixed on the wall inside the tube.

In general, a reactor tube contains a number of these holders at suitable distances from one another, in order for example to observe the temperature profile in the tube.

DETAILED DESCRIPTION OF THE INVENTION

The configuration according to the invention has the effect of reducing the otherwise observed tendency for packings with which the tubes are generally filled, of solid material, for example catalysts, to undergo channelling when a flow passes through them.

Use of the device according to the invention is not restricted to a specific type of tube or the material used for it. Tubes made of commercially available steels, such as are used for example in chemical plant construction, which have an inside tube diameter of 10 to 75 mm, are suitable. Tubes with an inside tube diameter of 15 to 50 mm are especially suitable. Tubes with an inside tube diameter of 15 to 30 mm are suitable in particular.

The material for the devices according to the invention is also not restricted to a specific type of wire or material. All commercially available wires are suitable; wires which are used for example in a known way as thermocouples for measuring temperatures are suitable in particular. The diameter of these solid or hollow wires may be up to 3 mm. Wires with a diameter of up to 2 mm are especially suitable.

The length of the wires is not limited and is adapted to the length of the tubes. Wires with a length of up to 20 metres are especially suitable.

Figure 1:
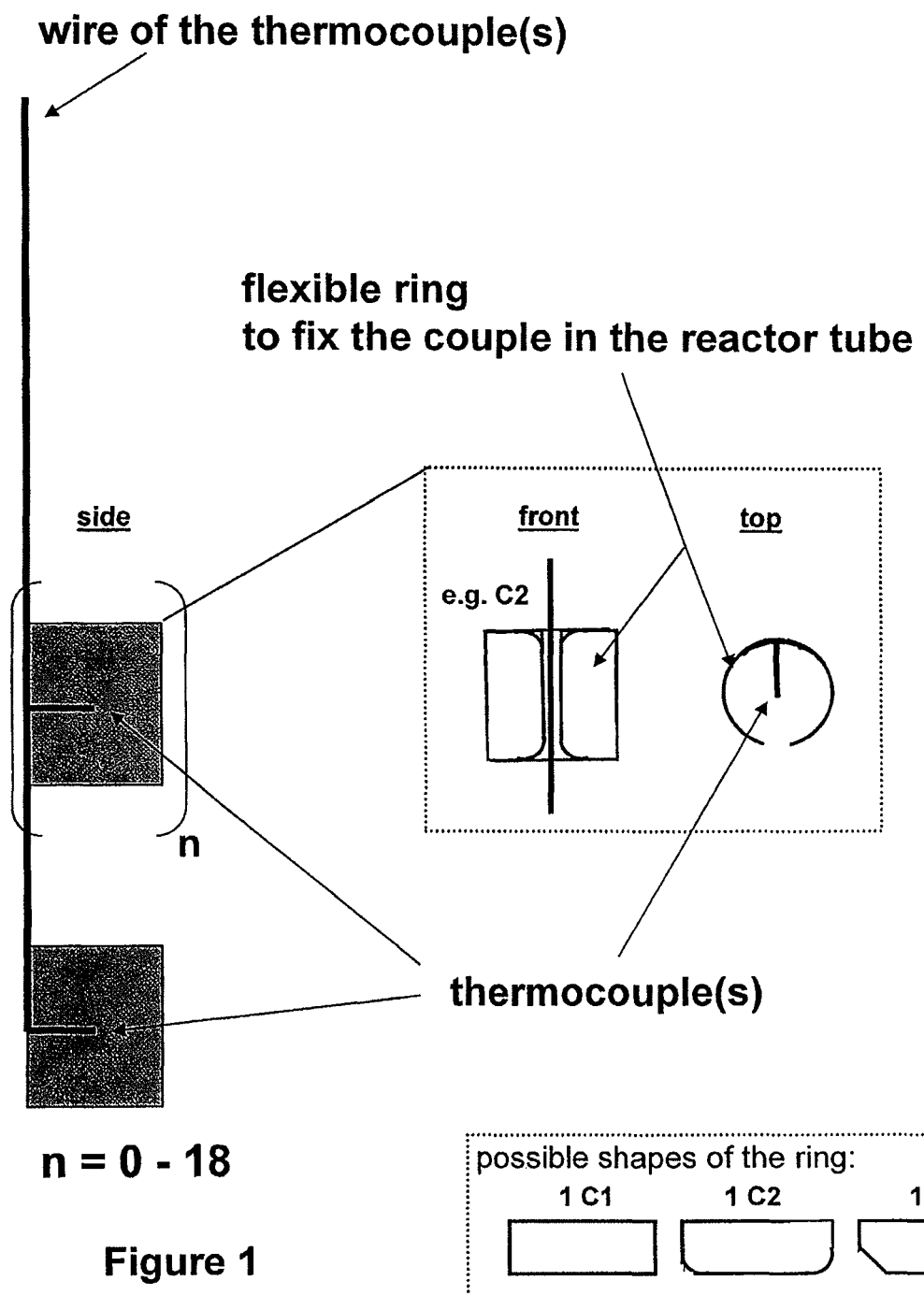
FIG. 1 is a schematic representation of the invention.
Figure 2:
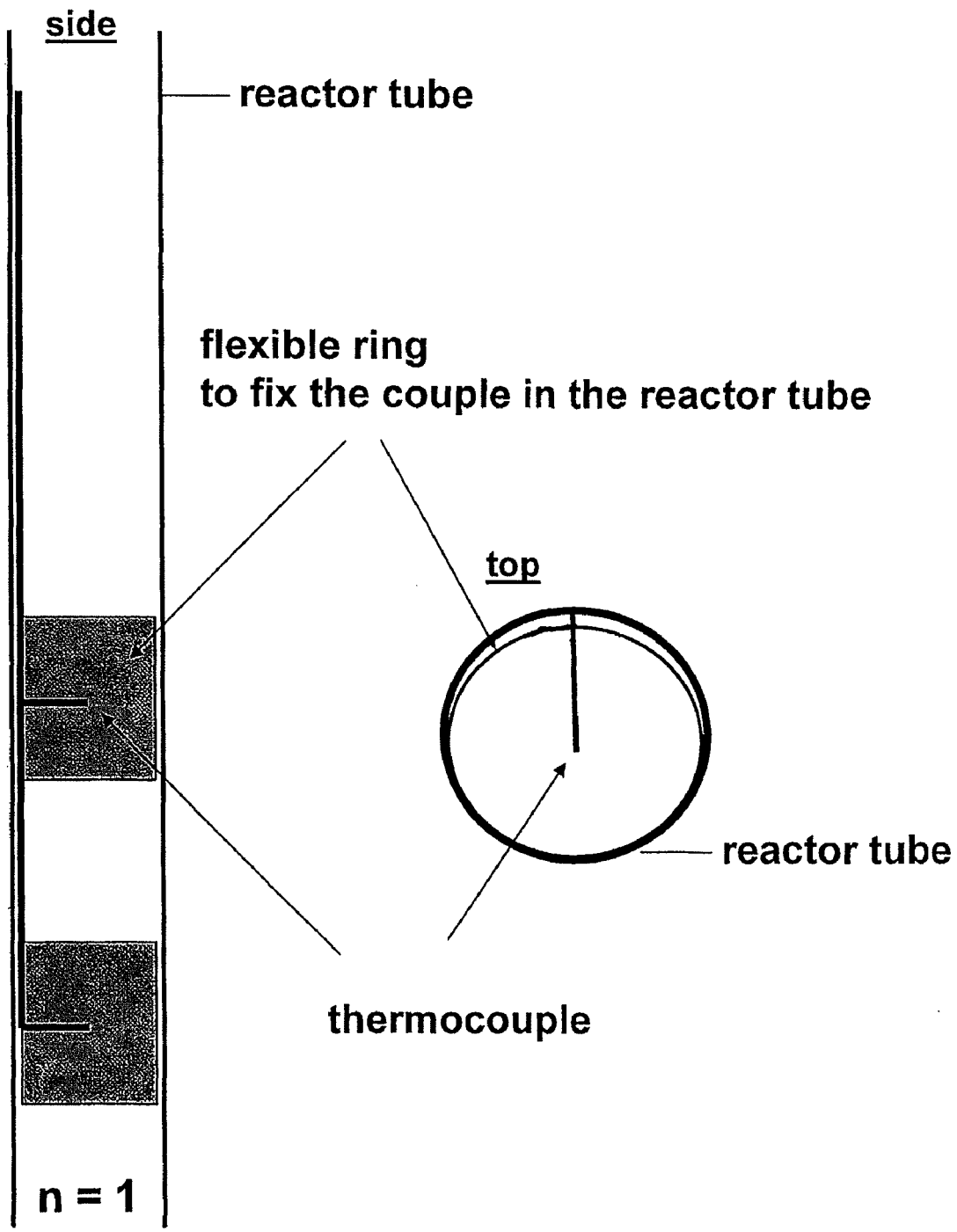
FIG. 2 is an additional schematic representation of the invention showing the flexible ring in position within a reactor tube.

Up to 20 wires may be led out of a tube (FIG. 1; n=18). However, it is expedient to lead up to 12 wires (n=10) out of the tube, especially preferred to lead out up to 6 wires (n=4).

The fastening device preferably has the form of a non-closed annularly bent rectangle, the corners of which are preferably rounded or bevelled.

The distance between the sides of the rectangle facing towards one another amounts to 1 to 10 mm, in particular 3 to 8 mm, depending on the diameter of the tube.

The height of the rectangle generally amounts to 15 to 80 mm, in particular 20 to 40 mm, depending on the diameter of the tube.

The devices according to the invention are preferably drawn into the tube by means of wire pulls, the pulling wire subsequently being released and removed from the tube. The devices are no longer displaced on account of the clamping action on the tube wall without being subjected to force.

The device is especially suitable for fixed-bed reactors in which liquid-phase or gas-phase reactions are carried out.

SHORT DESCRIPTION OF THE FIGURE

FIG. 1
A: cross-section of the tube (direction Y-Z)
B: longitudinal section of the tube (direction x)
C1 to C3: realizations of the devices for positioning
n: number of led in rods Further variations and modifications of the present invention will be apparent to those skilled in the art and are intended to be encompassed by the claims appended hereto. German priority application 10 2004 035 890.7 is relied on and incorporated herein by reference.

The invention claimed is:

1. A flexible ring device for positioning and fixing solid and hollow wires in a tube, said flexible ring comprising:
    a convex outer surface and a concave inner surface, said surfaces being radially spaced apart as to define a radial direction thickness in the ring that provides for flexibility in said ring;
    a first edge and a second edge, said edges being spaced apart by a distance in an axial direction that is perpendicular to the radial direction as to define an axial length of said ring;
    a continuous slot in the ring extending axially from said first and second edges and radially from the concave inner surface to the convex outer surface of said ring such that the flexible ring is a non-closed annular element, the continuous slot providing for circumferential size adjustment in said ring upon compression or expansion of said ring as to enable, in use, a friction engagement clamping relationship between circumferentially spaced apart first and second portions of the convex outer surface of said ring and an interior surface of the tube, and said ring being configured such that, in use, there is further defined a wire reception recess formed between the interior surface of the tube and a third portion of the convex outer surface of said ring, which third portion extends circumferentially between said first and second portions, and said first, second and third portions of the convex outer surface being configured as to provide for position fixing of one or more solid or hollow wires received in the wire reception recess with respect to the interior surface of the tube.

2. The device of claim 1 wherein said ring includes a bore that extends through the radial thickness of the ring as to provide an aperture for leading through one or more of the solid or hollow wires.

3. The flexible ring device according to claim 2, characterized in that the wire is led through the bore perpendicularly in relation to the direction of the tube to the middle of the tube.

4. The flexible ring device according to claim 3, characterized in that the wire is a thermocouple.

5. The device of claim 2 wherein the bore is positioned in an axial direction central region of the outer surface between the first and second edges.

6. The device of claim 1 wherein said bore is positioned in said ring diametrically opposed to a location of the continuous slot.

7. The device of claim 1 wherein said continuous slot is a linear slot extending parallel with an axial center line of a cavity defined by the inner surface of said ring.

8. The device of claim 1 wherein the radial thickness of said ring is less than an axial length of said ring.

9. The device of claim 1 wherein the concave inner surface of said ring defines a cavity that has an axial central axis that is offset and parallel relative to an axial central axis of the tube receiving said ring when in use.

10. The device of claim 1 wherein said ring includes a bore that extends though the radial thickness of the ring and said ring is configured as to provide for radial positioning of a thermocouple, associated with a wire fixed in position by said ring in the tube, within a cavity defined by the concave inner surface of said ring.

11. A fixing assembly comprising a plurality of the flexible rings of claim 1 with said flexible rings being spaced apart in an axial direction along a receiving tube interior, and said fixing assembly further comprising one or more solid or hollow wires that are in contact with the outer convex surface of said rings and extend axially between and beyond the axial length of said rings.

12. The fixing assembly of claim 11 further comprising one or more thermocouples positioned at the end of a respective wire and extending radially inward of the concave inner surface of a receiving one of said rings.

13. The fixing assembly of claim 11 further comprising a reactor tube that represents the tube with the interior surface in contact with said rings.

14. The fixing assembly of claim 11 wherein the tube is a reactor tube having an inlet end and an outlet end and catalyst particles in contact with said rings and positioned between the inlet and outlet ends of the tube.

15. The fixing assembly of claim 11 wherein one or more solid or hollow wires are fastened to the flexible rings as to provide for drawing the flexible rings into the tube by way of a wire pull.

16. A multi-tubular reactor comprising a plurality of reactor tubes with said reactor tubes each receiving the fixing assembly of claim 11 as well as a packing of solid material that is placed in contact with said fixing assemblies provided in respective tubes of said multi-tubular reactor.

17. The multi-tubular reactor of claim 16 comprising thousands of tubes.

18. The multi-tubular reactor of claim 16 wherein said packing is a catalyst packing.

19. The flexible ring device according to claim 1, characterized in that the device has the form of a non-closed annularly bent rectangle, the corners of which are rounded or beveled bevelled.

20. The flexible ring device according to claim 1, characterized in that the wire is a thermocouple.

21. A device for positioning a capillary in a tubular reactor using the flexible ring device of claim 1.

22. A tube filled with packing of solid material having disposed therein the flexible ring device of claim 1.

23. The flexible ring device according to claim 1, wherein said slot is parallel to the length of the tube.

24. The flexible ring device according to claim 1, wherein said clamping relation is achieved by way of a clamping action that includes expansion of said annular element from a previously compressed state upon insertion of said ring into the tube so as to provide for position retention contact between the first and second outer portions of said ring with respective, circumferentially spaced apart adjacent interior surface segments of the interior surface of the tube.

* * * * *